US012173640B2

United States Patent
Mastrogiacomo et al.

(10) Patent No.: US 12,173,640 B2
(45) Date of Patent: Dec. 24, 2024

(54) VENTED PRE-CHAMBER IGNITOR

(71) Applicant: Ford Global Technologies, LLC, Dearborn, MI (US)

(72) Inventors: Vincent Mastrogiacomo, Plymouth, MI (US); Thomas Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 18/149,781

(22) Filed: Jan. 4, 2023

(65) Prior Publication Data

US 2024/0218824 A1    Jul. 4, 2024

(51) Int. Cl.
*F02B 19/12*    (2006.01)
*F02B 19/10*    (2006.01)
*F02M 26/41*    (2016.01)

(52) U.S. Cl.
CPC .......... *F02B 19/12* (2013.01); *F02B 19/1004* (2013.01); *F02B 19/1033* (2013.01); *F02M 26/41* (2016.02)

(58) Field of Classification Search
CPC .. F02B 19/12; F02B 19/1004; F02B 19/1033; F02M 26/41
See application file for complete search history.

(56) References Cited

U.S. PATENT DOCUMENTS

| | | |
|---|---|---|
| 9,249,746 B2 | 2/2016 | Geckler et al. |
| 10,724,423 B2 | 7/2020 | Loetz |
| 11,066,980 B1 | 7/2021 | Leone et al. |
| 11,156,149 B1 | 10/2021 | Leone et al. |
| 11,215,109 B2 | 1/2022 | Ono et al. |
| 11,293,337 B1 | 4/2022 | Czekala et al. |
| 11,365,685 B2 | 6/2022 | Leone et al. |
| 11,378,002 B1 | 7/2022 | Leone et al. |
| 11,512,624 B1 | 11/2022 | Leone et al. |
| 2013/0206122 A1* | 8/2013 | Chiera ................. F02P 15/001 123/594 |
| 2016/0053671 A1* | 2/2016 | Sotiropoulou ...... F02B 19/1014 123/260 |
| 2016/0215682 A1 | 7/2016 | Hiltner et al. |
| 2018/0230894 A1 | 8/2018 | Loetz |
| 2020/0165961 A1* | 5/2020 | Hamada ................. F02F 1/242 |
| 2021/0246822 A1 | 8/2021 | Ono et al. |

FOREIGN PATENT DOCUMENTS

| | | |
|---|---|---|
| DE | 102019101435 A1 | 9/2019 |
| JP | 2021127706 A | 9/2021 |
| WO | 2016057557 A1 | 4/2016 |

OTHER PUBLICATIONS

Leone, T. et al., "Methods and Systems for Pre-Chamber," U.S. Appl. No. 17/809,530, filed Jun. 28, 2022, 40 pages.

\* cited by examiner

*Primary Examiner* — Xiao En Mo

(74) *Attorney, Agent, or Firm* — Vincent Mastrogiacomo; McCoy Russell LLP

(57) ABSTRACT

System and methods for an internal combustion engine are described. In one example, the internal combustion engine may be a boosted internal combustion engine that includes an igniter that is at least partially positioned in a cylinder of the internal combustion engine. The igniter includes an orifice that is configured to release exhaust from a pre-chamber of the igniter.

18 Claims, 4 Drawing Sheets

VENTED PRE-CHAMBER IGNITOR

FIELD

The present description relates to an ignition source for combustion in an internal combustion engine. The ignition sources may include a pre-chamber that includes a spark plug and a port to exhaust residual gases away from the pre-chamber.

BACKGROUND AND SUMMARY

Igniters that include a spark source and a pre-chamber are known to increase an engine's tolerance for high percentages of exhaust gas recirculation (EGR) in a cylinder mixture. The ignitors may include a cap that includes one or more orifices. The spark source in the igniter may be activated during a cylinder cycle to combust an air-fuel mixture that is within pre-chamber that is formed at least partially by the cap. Igniting the air-fuel mixture within the pre-chamber may cause high temperature jets to extend from the orifices and into a cylinder's combustion chamber where an air-fuel mixture may be combusted via the high temperature jets. However, the pre-chambers may hold residual gases from one engine cycle to the next engine cycle. This may prevent the igniter from combusting contents within the pre-chamber during a subsequent engine cycle. In addition, the volume of the pre-chamber may allow the igniter to initiate combustion within a cylinder at some speeds and loads, but the volume of the pre-chamber may operate to prevent the igniter from working well at other engine speeds and loads. Therefore, it may be desirable to provide an igniter that may be more robust across a larger engine speed and load range.

The inventors herein have recognized the above-mentioned issues and have developed an igniter system, comprising: a ceramic insulator; a center electrode; a pre-chamber; one or more orifices allowing access to the pre-chamber; and an exhaust orifice positioned between a first group of threads and a second group of threads.

By providing an igniter that includes an exhaust orifice positioned between a first group of threads and a second group of threads, it may be possible to provide an ignition source that may be less sensitive to engine operating conditions. In particular, the orifice may allow exhaust gases to be removed from a pre-chamber of an igniter so that an air-fuel mixture in the pre-chamber may combust. The orifice may allow exhaust gases to escape from the pre-chamber whether the engine is operated at low load or high load conditions.

The present description may provide several advantages. In particular, the approach may allow an engine to combust air-fuel mixtures more robustly. Further, the approach may be cheaper to implement as compared to active pre-chamber designs. Additionally, the igniter may be implemented in a way that is similar to the way a spark plug is implemented.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
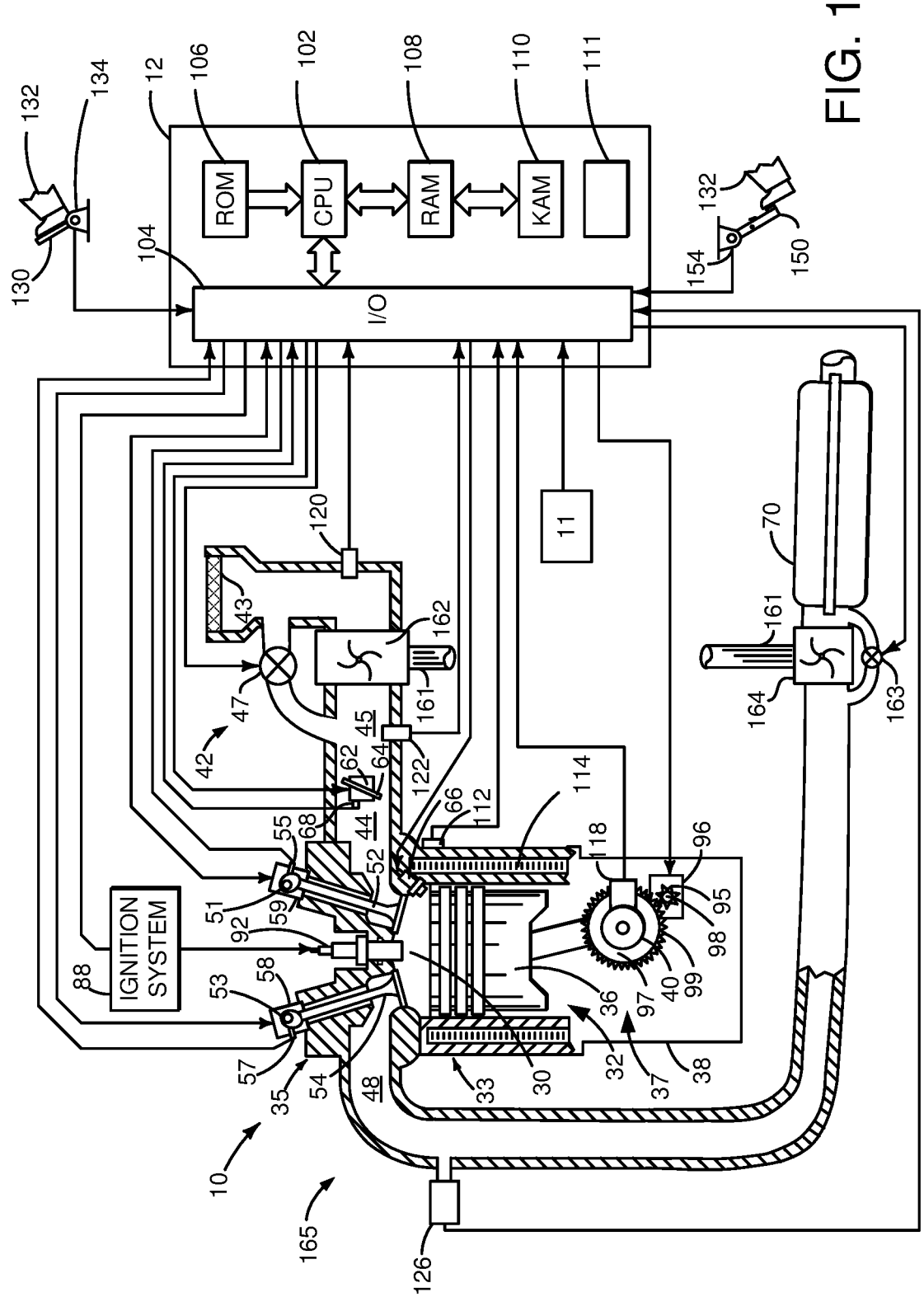
FIG. 1 is a schematic diagram of an engine.
Figure 2:
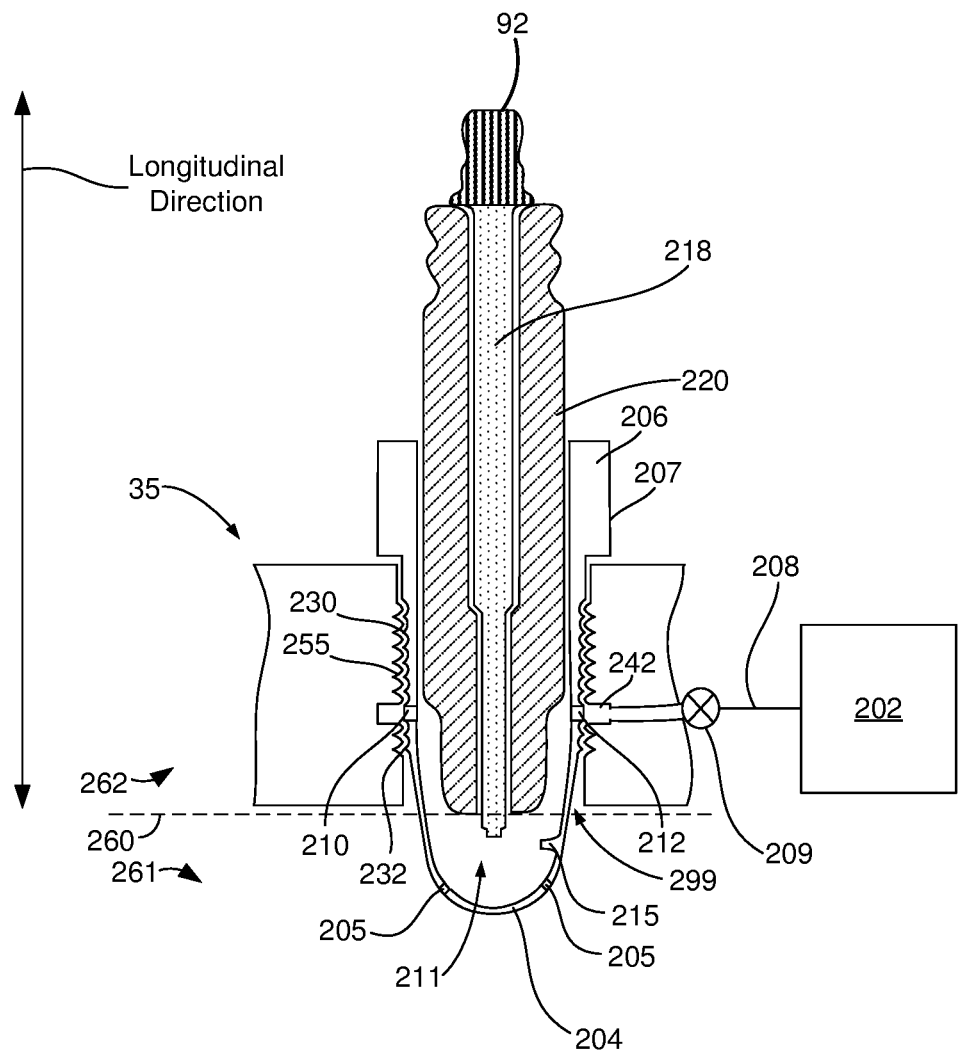
FIGS. 2 and 3 are example igniters that may be included with the engine of FIG. 1.
Figure 3:
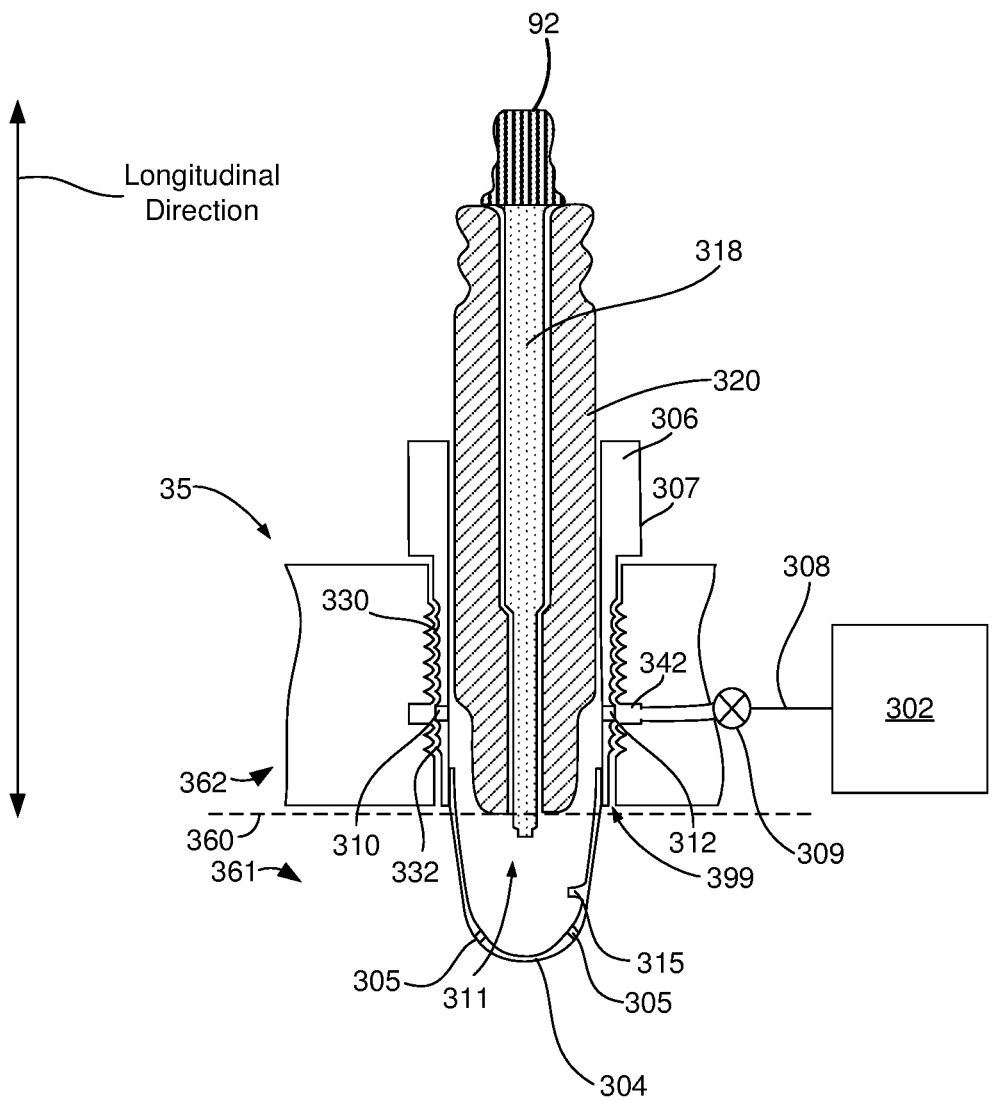

The present description is related to an igniter and operating an engine that includes the igniter. The igniter may be installed into a cylinder via a cylinder head as shown in FIG. 1. The igniter may be configured as shown in FIG. 2 or FIG. 3. The igniter may be a robust ignition source for air-fuel mixtures of a cylinder. The igniter may be applied in a boosted engine as shown in FIG. 1. The igniter may be applied according to the method of FIG. 4.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIG. 1. Further, controller 12 employs the actuators shown in FIG. 1 to adjust engine operation based on the received signals and instructions stored in non-transitory memory of controller 12.

Engine 10 is comprised of cylinder head 35 and block 33, which include combustion chamber 30 and cylinder 32. Piston 36 is positioned therein and reciprocates via a connection to crankshaft 40. Flywheel 97 and ring gear 99 are coupled to crankshaft 40. Engine 10 includes an oil pan 38 that is coupled to block 33. Block 33 and oil pan 38 form an engine crankcase 37 that holds oil and blow-by gases. Blow-by gases may be returned to engine air intake 42 via a positive crankcase ventilation system (not shown).

Starter 96 (e.g., an optional low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into combustion chamber 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via igniter 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust system 165 includes exhaust manifold 48, catalytic converter 70, and oxygen sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as igniter 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a schematic of a first example igniter 92 is shown. Igniter 92 may be the same igniter that is shown in FIG. 1. Igniter 92 is shown in cross section.

Igniter 92 includes a body 206, a center electrode 218, and an insulator 220. The body 206 may be of metallic construction and the insulator 220 may be of ceramic construction. The center electrode 218 may be comprised of one or more materials including but not limited to copper.

Body 206 includes a hex 207, a ground electrode 215, a first group of threads 230, a second group of threads 232, and a shield or cover 204. First thread group 230 is positioned in a longitudinal direction above and on a first side of exhaust gas orifices or ports 210 and 212. Second thread group 232 is positioned in a longitudinal direction below and on a second side of exhaust gas orifices or ports 210 and 212 that are also included in body 206. First thread group 230 and second thread group 232 are configured to engage cylinder head threads 255. Shield or cover 204 provides a portion of a boundary for pre-chamber 211. Shield or cover 204 at least partially encloses pre-chamber 211. Shield or cover 204 includes orifices 205, which allow gases (e.g., air and fuel vapor) from cylinder 32 to enter and exit pre-chamber 211. Insulator 220 and center electrode 218 may be press fit into body 206.

Cylinder head 35 includes a through hole 299 into which igniter 92 may be inserted as shown in FIG. 2. Cylinder head 35 also includes an exhaust passage 242 that is configured to receive exhaust gases from pre-chamber 211 via exhaust gas orifices or ports 210 and 212. In one example, exhaust passage 242 may be circular in shape so that exhaust gas orifices or ports 210 and 212 may align with exhaust passage 242 at different angular positions. Optional valve 209 may allow or prevent exhaust gases from entering distribution passage 208. Distribution passage 208 may direct exhaust gases to system or device 202. In a first example, system or device 202 may be an exhaust gas recirculation system. In a second example, system or device 202 may be a positive crankcase ventilation system that may evacuate exhaust gases from crankcase 37. In a third example, system or device 202 may be an engine air intake system. In a fourth example, system or device 202 may be an engine crankcase. In a fifth example, system or device 202 may be an exhaust system. Optional valve 209 may be a controller adjusted valve or a pressure controlled valve that closes in response to cylinder pressure when cylinder pressure is greater than a threshold pressure.

Dashed line 260 represents a plane that separates igniter 92 into two regions or sides. In particular, a second region or side 262 is longitudinally above dashed line 260, and dashed line 260 marks where center electrode 218 begins to protrude from insulator 220 into the pre-chamber 211. A first region or side 261 is longitudinally below dashed line 260. Orifices 205 are shown on the first side 262 of igniter 92 and one or more exhaust orifices 210 and 212 are shown on the second side 261 of igniter 92.

Referring now to FIG. 3, a schematic of a second example igniter 92 is shown. Igniter 92 may be the same igniter that is shown in FIG. 1. Igniter 92 is shown in cross section.

Igniter 92 includes a body 306, a center electrode 318, and an insulator 320. The body 306 may be of metallic construction and the insulator 320 may be of ceramic construction. The center electrode 318 may be comprised of one or more materials including but not limited to copper.

Body 306 includes a hex 307, a first group of threads 330 and a second group of threads 332. First thread group 330 is positioned in a longitudinal direction above and on a first side of exhaust gas orifices or ports 310 and 312 that are also included in body 306. Second thread group 332 is positioned in a longitudinal direction below and on a second side of exhaust gas orifices or ports 310 and 312. First thread group 330 and second thread group 332 are configured to engage cylinder head threads 255. Cap 304 provides a portion of a boundary for pre-chamber 311. Cap 304 at least partially encloses pre-chamber 311. Cap 304 includes orifices 305, which allow gases (e.g., air and fuel vapor) from cylinder 32 to enter and exit pre-chamber 311. Cap 304 may be press fit to body 306 and cap 304 includes a ground electrode 315

Cylinder head 35 includes a through hole 399 into which igniter 92 may be inserted as shown. Cylinder head 35 also includes an exhaust passage 342 that is configured to receive exhaust gases from pre-chamber 311 via exhaust gas orifices or ports 310 and 312. In one example, exhaust passage 342 may be circular in shape so that exhaust gas orifices or ports 310 and 312 may align with exhaust passage 342 at different angular positions. Optional valve 309 may allow or prevent exhaust gases from entering distribution passage 308. Distribution passage 308 may direct exhaust gases to system or device 302. In a first example, system or device 302 may be an exhaust gas recirculation system. In a second example, system or device 302 may be a positive crankcase ventilation system that may evacuate exhaust gases from crankcase 37. In a third example, system or device 302 may be an engine air intake system. In a fourth example, system or device 302 may be an engine crankcase. In a fifth example, system or device 302 may be an exhaust system. Valve 309 may be a controller adjusted valve or a pressure controlled valve that closes in response to cylinder pressure when cylinder pressure is greater than a threshold pressure.

Dashed line 360 represents a plane that separates igniter 92 into two regions or sides. In particular, a second region or side 362 is longitudinally above dashed line 360, and dashed line 360 marks where center electrode 318 begins to protrude from insulator 320 into the pre-chamber 311. A first region or side 361 is longitudinally below dashed line 360. Orifices 305 are shown on the first side 362 of igniter 92 and one or more exhaust orifices 310 and 312 are shown on the second side 361 of igniter 92.

While FIGS. 2 and 3 show exhaust gas orifices that are positioned between two thread groups, it should be appreciated that exhaust gas orifices included with the igniter may be provided at alternative positions and in alternative arrangements. Similarly, it should be appreciated that passages in the cylinder head receiving exhaust gases from the exhaust gas orifices may be configured in alternative orientations and arrangements.

The systems of FIGS. 1-3 may provide for an igniter system, comprising: a ceramic insulator; a center electrode; a pre-chamber; one or more orifices positioned on a first side of the igniter system and allowing access to the pre-chamber; and one or more exhaust orifices positioned on a second side of the igniter system. In a first example, the igniter system includes where the one or more exhaust orifices are positioned between a first group of threads and a second group of threads, the first group of threads and the second group of threads configured to engage threads of a cylinder head. In a second example that may include the first example, the igniter system further comprising a pre-chamber cap. In a third example that may include one or both of the first and second examples, the igniter system includes where the one or more orifices are included in the pre-chamber cap. In a fourth example that may include one or more of the first through third examples, the igniter system further comprises a ground electrode, the ground electrode included with the pre-chamber cap. In a fifth example that may include one or more of the first through fourth examples, the igniter system further comprises a body of the igniter system, and where the one or more orifices and are included in the body of the igniter system. In a sixth example that may include one or more of the first through fifth examples, the igniter system includes where the body includes the first group of threads and the second group of threads. In a seventh example that may include one or more of the first through sixth examples, the igniter system includes where the pre-chamber is at least partially bounded by the center electrode, the ceramic insulator, and a body of the ignitor system.

The system of FIGS. 1-3 also provides for an igniter system, comprising: a ceramic insulator; a center electrode; a pre-chamber; one or more orifices allowing access to the pre-chamber on a first side of the igniter system; one or more exhaust orifices positioned on a second side of the igniter system; and a cylinder head including an exhaust passage, the exhaust passage configured to receive exhaust gas from the exhaust orifice. In a first example, the igniter system includes where the exhaust orifice leads to an engine air-intake system. In a second example that may include the first example, the igniter system includes where the exhaust orifice leads to an engine crankcase. In a third example that may include one or both of the first and second examples, the igniter system includes where the exhaust orifice leads to an engine exhaust system. In a fourth example that may include one or more of the first through third examples, the igniter system further comprises a pre-chamber cap.

Figure 4:
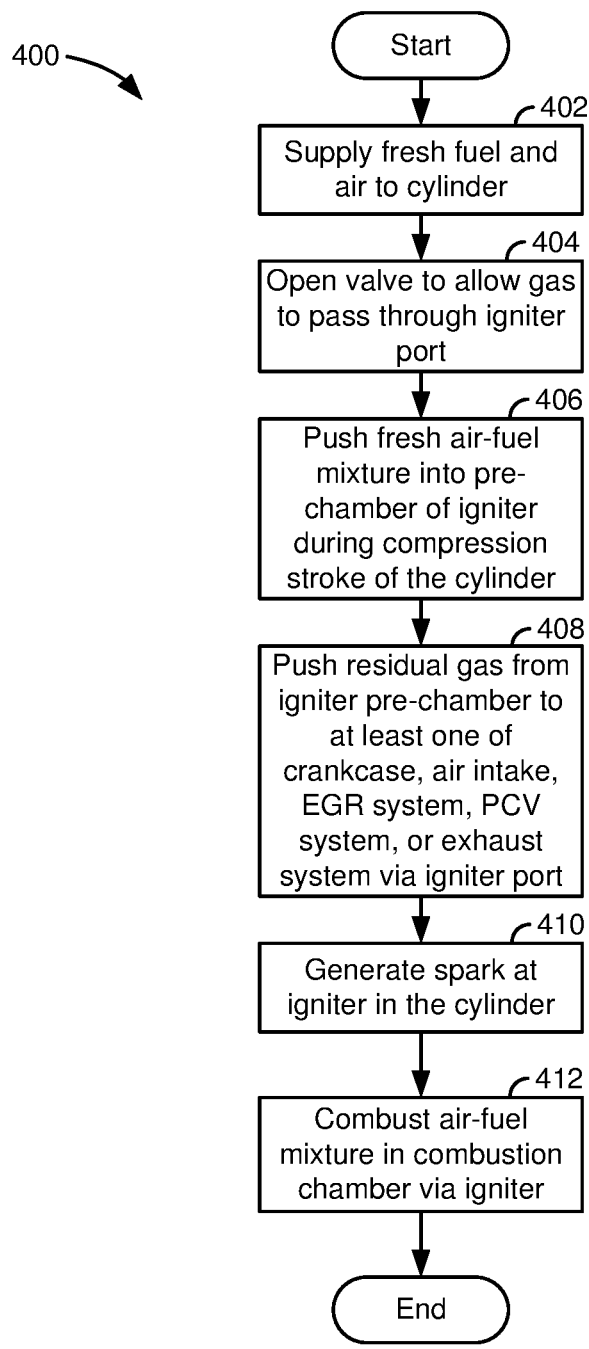
FIG. 4 is a method for applying an igniter.

Referring now to FIG. 4, a flow chart of a method for operating an engine that includes an igniter as shown in either of FIG. 2 of FIG. 3 is shown. The method of FIG. 4 may be applied to the system of FIG. 1. The method of FIG.

4 may be performed automatically via igniter components or via a technician. Further, a controller may perform at least a portion of method 400 via changing operating statues of a human/machine interface. Operating states of an engine's igniter may be transformed automatically or via the technician. The method of FIG. 4 is described in terms of operations for a single cylinder; however, the method may be applied to each engine cylinder.

At 402, method 400 supplies fresh air and fuel to an engine cylinder. Method 400 may adjust an amount of air and fuel that is delivered to an engine cylinder via adjusting throttle position, valve timing, and fuel injection timing. The adjustments may be based on a driver demand torque that is determined from driver demand pedal position and vehicle speed. Method 400 proceeds to 404.

At 404, method 400 opens a valve (e.g., 209 of FIG. 2) for purging exhaust gases from a pre-chamber of an igniter via a controller. Opening the valve allows exhaust gases from a prior combustion of air and fuel in the pre-chamber during a prior cycle of the cylinder to be purged during a compression stroke of the cylinder. Method 400 proceeds to 406.

At, 406, method 400 pushes fresh air and fuel into a pre-chamber of an igniter. The air and fuel mixture may be pushed into the pre-chamber by the cylinder's piston raising pressure in the cylinder during the cylinder's compression stroke. The fresh air and fuel enters the pre-chamber via orifices in a cap or shield of the igniter. Method 400 proceeds to 408.

At 408, method 400 pushes exhaust gases from the prior cylinder cycle out of the pre-chamber via exhaust gas orifices or ports (e.g., 210 and 212 of FIG. 2 or 310 and 312 of FIG. 3) during the present cylinder cycle. The exhaust gas in the pre-chamber may be pushed to a positive crankcase ventilation system, an exhaust gas recirculation system, engine crankcase, or engine air intake. A moving piston in the cylinder provides the motive force to move the exhaust gases. Method 400 proceeds to 410.

At 410, method 400 generates a spark within the pre-chamber via applying a voltage to the center electrode. The spark may be initiated at a time that is based on engine speed and load. Method 400 proceeds to 412.

At 412, method 400 combusts an air-fuel mixture that is within an igniter. Combusting the air-fuel mixture in the igniter causes heated gases and flame to exit the igniter and combust an air-fuel mixture that is in the engine cylinder. Combusting the air-fuel mixture in the cylinder increases pressure in the cylinder and generates exhaust gases in the cylinder and in the pre-chamber. The engine's exhaust valves open to flush exhaust gases from the cylinder, but some exhaust gas may remain in the pre-chamber of the igniter. Method 400 proceeds to exit.

In this way, robustness of combustion in a pre-chamber may be enhanced so that more stable combustion within a cylinder may be achieved. In particular, evacuating the exhaust gases from the pre-chamber may improve combustion robustness in the pre-chamber and robust combustion in the pre-chamber may help to ensure better combustion stability of the cylinder.

The method of FIG. 4 provides for an engine operating method, comprising: introducing an air-fuel mixture to a pre-chamber of an igniter; combusting at least a portion of the air-fuel mixture via the igniter; and evacuating at least a portion of exhaust gases from the pre-chamber to an area of an engine other than a cylinder of the engine without the exhaust gases flowing through the cylinder other than in the igniter. In a first example, the engine method includes where the exhaust gases flow through an orifice of the igniter. In a second example that may include the first example, the engine method includes where the exhaust gases flow through an exhaust gas recirculation system. In a third example that may include one or both of the first and second examples, the engine method includes where the exhaust gases flow through a positive crankcase ventilation system. In a fourth example that may include one or more of the first through third examples, the engine method includes where the exhaust gases flow into an air intake system. In a fifth example that may include one or more of the first through fourth examples, the engine method includes where the exhaust gases flow into an engine crankcase. In a sixth example that may include one or more of the first through fifth examples, the method includes where the igniter is positioned in the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An igniter system, comprising:
a ceramic insulator;
a center electrode;
a pre-chamber;
one or more orifices positioned on a first side of the igniter system and allowing access to the pre-chamber; and
one or more exhaust orifices positioned on a second side of the igniter system, where the one or more exhaust orifices are positioned between a first group of threads and a second group of threads, the first group of threads and the second group of threads configured to engage threads of a cylinder head.

2. The igniter system of claim 1, further comprising a pre-chamber cap.

3. The igniter system of claim 2, where the one or more orifices are included in the pre-chamber cap.

4. The igniter system of claim 3, further comprising a ground electrode, the ground electrode included with the pre-chamber cap.

5. The igniter system of claim 1, further comprising a body of the igniter system, and where the one or more orifices and are included in the body of the igniter system.

6. The igniter system of claim 5, where the body includes a first group of threads and a second group of threads.

7. The igniter system of claim 1, where the pre-chamber is at least partially bounded by the center electrode, the ceramic insulator, and a body of the igniter system.

8. An engine operating method, comprising:
introducing an air-fuel mixture to a pre-chamber of an igniter;
combusting at least a portion of the air-fuel mixture via the igniter; and
evacuating at least a portion of exhaust gases from the pre-chamber to an area of an engine other than a cylinder of the engine without the exhaust gases flowing through the cylinder other than in the igniter.

9. The engine operating method of claim 8, where the exhaust gases flow through an orifice of the igniter.

10. The engine operating method of claim 9, where the exhaust gases flow through an exhaust gas recirculation system.

11. The engine operating method of claim 9, where the exhaust gases flow through a positive crankcase ventilation system.

12. The engine operating method of claim 9, where the exhaust gases flow into an air intake system.

13. The engine operating method of claim 9, where the exhaust gases flow into an engine crankcase.

14. The engine operating method of claim 9, where the igniter is positioned in the cylinder.

15. An igniter system, comprising:
a ceramic insulator;
a center electrode;
a pre-chamber;
one or more orifices allowing access to the pre-chamber on a first side of the igniter system;
one or more exhaust orifices positioned on a second side of the igniter system; and
a cylinder head including an exhaust passage, the exhaust passage configured to receive exhaust gas from the exhaust orifice, where the one or more exhaust orifices lead to an engine air-intake system.

16. The igniter system of claim 15, further comprising a pre-chamber cap.

17. An igniter system, comprising:
a ceramic insulator;
a center electrode;
a pre-chamber;
one or more orifices allowing access to the pre-chamber on a first side of the igniter system;
one or more exhaust orifices positioned on a second side of the igniter system; and
a cylinder head including an exhaust passage, the exhaust passage configured to receive exhaust gas from the exhaust orifice, where the one or more exhaust orifices lead to an engine crankcase.

18. The igniter system of claim 17, further comprising a pre-chamber cap.

* * * * *